(12) United States Patent
Wang (10) Patent No.: US 9,319,875 B2
(45) Date of Patent: Apr. 19, 2016

(54) AUTHENTICATION FOR DECIPHERING CIPHERTEXT AND DISPLAYING DECIPHERED INFORMATION

(75) Inventor: Zhanfeng Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/394,328

(22) PCT Filed: Jul. 13, 2012

(86) PCT No.: PCT/CN2012/078615
§ 371 (c)(1),
(2), (4) Date: Oct. 14, 2014

(87) PCT Pub. No.: WO2013/155800
PCT Pub. Date: Oct. 24, 2013

(65) Prior Publication Data
US 2015/0067876 A1 Mar. 5, 2015

(30) Foreign Application Priority Data
Apr. 16, 2012 (CN) .......................... 2012 1 0111155

(51) Int. Cl.
*H04W 12/02* (2009.01)
*G06F 21/60* (2013.01)
(Continued)

(52) U.S. Cl.
CPC ............... *H04W 12/02* (2013.01); *G06F 21/60* (2013.01); *H04M 1/2745* (2013.01); *H04M 1/67* (2013.01); *H04W 88/02* (2013.01)

(58) Field of Classification Search
CPC .... G06F 21/606; H04W 12/02; H04W 88/02; H04M 1/67; H04M 1/2745
USPC ............................................ 726/26; 713/189
See application file for complete search history.

(56) References Cited

U.S. PATENT DOCUMENTS

| 7,103,775 B2 * | 9/2006 | Obana ................... H04L 9/3255 380/200 |
| 7,210,044 B2 * | 4/2007 | Lai ............................ H04K 1/00 713/189 |

(Continued)

FOREIGN PATENT DOCUMENTS

| CN | 1553728 A | 12/2004 |
| CN | 1655637 A | 8/2005 |

(Continued)

OTHER PUBLICATIONS

International Search Report in international application No. PCT/CN2012/078615, mailed on Jan. 24, 2013.

(Continued)

*Primary Examiner* — Haresh N Patel
(74) *Attorney, Agent, or Firm* — Oppedahl Patent Law Firm LLC (57) ABSTRACT

Disclosed are a method and device for managing security of information in a mobile terminal, as well as a mobile terminal. In creating and initializing a text file, first mobile terminal ID information is written in a starting part of the text file; and in storing information, information to be stored is ciphered and written in the text file, and the text file is stored; in reading the first mobile terminal ID information and the stored information, the first mobile terminal ID information and the ciphered information are loaded into a memory; and a mode of displaying text information is determined; and in displaying the stored information, when it is determined to display text information as plaintext, authentication is performed to determine if a local mobile terminal is authorized to decipher the ciphered information loaded in the memory according to the first mobile terminal ID information, and when the mobile terminal is authorized, the ciphered information is deciphered and displayed as plaintext, or ciphertext is displayed if the mobile terminal is not authorized. With the disclosure, it is possible to effectively stop someone other than a user of a mobile terminal from connecting the mobile terminal to a computer through a Universal Serial Bus (USB) and stealing user information in the mobile terminal.

13 Claims, 3 Drawing Sheets

(51) Int. Cl.
*H04W 88/02* (2009.01)
*H04M 1/2745* (2006.01)
*H04M 1/67* (2006.01)

(56) References Cited

U.S. PATENT DOCUMENTS

| | | | | |
|---|---|---|---|---|
| 7,308,431 B2* | 12/2007 | Asokan | ................. | G06Q 20/02 705/64 |
| 7,487,547 B2* | 2/2009 | Nakai | ................. | G06F 21/10 380/247 |
| 8,166,300 B2* | 4/2012 | Bjorkengren | ........... | G06F 21/10 713/151 |
| 8,559,631 B1* | 10/2013 | Waters | ................. | H04L 9/085 380/28 |
| 8,561,200 B2* | 10/2013 | Costa | ................. | H04L 63/0853 726/26 |
| 8,572,372 B2* | 10/2013 | Varriale | .............. | G06F 21/6209 380/247 |
| 8,630,420 B2* | 1/2014 | Galante | ................. | H04L 63/068 380/247 |
| 8,661,239 B2* | 2/2014 | Liu | ................. | G06F 21/34 713/150 |
| 8,789,195 B2* | 7/2014 | Bianco | ................. | G06F 12/1466 726/26 |
| 8,819,448 B2* | 8/2014 | Frieder | ............... | G06F 21/6245 380/277 |
| 8,825,998 B2* | 9/2014 | Lescuyer | ............ | H04L 63/0428 380/258 |
| 8,977,294 B2* | 3/2015 | De Atley | ................. | H04M 1/66 340/539.13 |
| 9,014,372 B2* | 4/2015 | Chen | ................. | G06F 21/602 380/200 |
| 2004/0030906 A1 | 2/2004 | Marmigere | | |
| 2005/0176467 A1 | 8/2005 | Kim | | |
| 2008/0207169 A1 | 8/2008 | Park | | |
| 2011/0034211 A1 | 2/2011 | Li | | |
| 2011/0154029 A1* | 6/2011 | Hahn | ................. | H04L 9/0822 713/160 |
| 2012/0054874 A1* | 3/2012 | Chaudhri | ............ | G06F 3/04883 726/26 |
| 2012/0180136 A1* | 7/2012 | Song | ................. | G06F 17/30557 726/26 |
| 2012/0189120 A1 | 7/2012 | Sun | | |
| 2014/0331329 A1* | 11/2014 | Edge | ................. | G06F 21/606 726/26 |
| 2015/0067876 A1* | 3/2015 | Wang | ................. | H04W 12/02 726/26 |
| 2015/0106614 A1* | 4/2015 | Lee | ................. | G06F 21/6263 713/150 |
| 2015/0186621 A1* | 7/2015 | Uy | ................. | G06F 21/10 726/26 |

FOREIGN PATENT DOCUMENTS

| | | |
|---|---|---|
| CN | 101304453 A | 11/2008 |
| CN | 101316381 A | 12/2008 |
| CN | 101826963 A | 9/2010 |
| CN | 101990033 A | 3/2011 |
| EP | 1965332 A1 | 9/2008 |
| EP | 2341657 A1 | 7/2011 |
| JP | 9135469 A | 5/1997 |
| JP | 2002300254 A | 10/2002 |
| JP | 2004240699 A | 8/2004 |
| JP | 2007312357 A | 11/2007 |
| JP | 2008060703 A | 3/2008 |
| JP | 2011035497 A | 2/2011 |
| JP | 2012065137 A | 3/2012 |
| KR | 20050080335 A | 8/2005 |

OTHER PUBLICATIONS

English Translation of the Written Opinion of the International Search Authority in international application No. PCT/CN2012/078615, mailed on Jan. 24, 2013.

Supplementary European Search Report in European application No. 12874806.8, mailed on Apr. 16, 2015.

* cited by examiner

AUTHENTICATION FOR DECIPHERING CIPHERTEXT AND DISPLAYING DECIPHERED INFORMATION

TECHNICAL FIELD

The disclosure relates to the field of mobile communication technology, and in particular to a method and device for managing security of information in a mobile terminal, as well as a mobile terminal.

BACKGROUND

With wide spread of mobile terminals, information stored in a mobile terminal of a user faces a growing security problem. When a mobile terminal is out of control of its user within a short period of time, such as when the user leaves the mobile terminal in an office or a hotel, or at home, or loses the mobile terminal, if information on contacts, short messages, call records stored in the mobile terminal relates to user privacy, then chances of the mobile terminal being used by someone else will pose a serious potential threat to security of the user information in the mobile terminal.

A corresponding solution has been proposed in existing art to secure information in a mobile terminal. For example, contacts of a mobile terminal user are classified as general contacts and private contacts; and the general contacts and the private contacts are stored separately. When a private contact calls or sends a short message, information displayed on an interface of a mobile terminal is hidden or ciphered. Alternatively, based on a preset mode of displaying a contact, information on a general contact is displayed as plaintext, and information on a private contact is displayed in cipher.

With the existing art, information in a mobile terminal is secured by hiding or ciphering information displayed on an interface of a mobile terminal. However, when a user loses control over a mobile terminal within a short period of time, an existing method cannot stop someone else from connecting the mobile terminal to a computer via a Universal Serial Bus (USB) and stealing the information stored in the mobile terminal, such as by connecting the mobile terminal to a computer via a USB, and copying an information storing database file in the mobile terminal to the computer, and then to an unauthorized mobile terminal. Then, information on contacts, short messages, call records and memos stored in the mobile terminal of the user may be identified and displayed normally by the unauthorized mobile terminal. In particular, there will be a higher probability of successfully stealing information in one mobile terminal with another mobile terminal of the same brand and the same model. In addition, if a mobile terminal of a user is connected to a computer via a USB, then someone other than the user may acquire information on contacts, short messages, call records and memos stored in the mobile terminal easily using a PC (personal computer) side software of the mobile terminal.

SUMMARY

In view of this, it is desired that embodiments of the disclosure provide a method and device for managing security of information in a mobile terminal, as well as a mobile terminal, capable of effectively stopping someone, other than a user of a mobile terminal, from connecting the mobile terminal to a computer through a USB and stealing user information in the mobile terminal.

To this end, a technical solution of the disclosure is implemented as follows.

The disclosure provides a method for managing security of information in a mobile terminal, including steps of:

in creating and initializing a text file, writing first mobile terminal identifier (ID) information in a starting part of the text file; and in storing information, ciphering information to be stored, writing the ciphered information in the text file, and storing the text file; in reading the first mobile terminal ID information and the stored information, loading the first mobile terminal ID information and the ciphered information into a memory; and determining a mode of displaying text information; and in displaying the stored information, when a mode of displaying text information as plaintext is determined, authenticating, according to the first mobile terminal ID information, an authorization for decipherment of the ciphered information loaded in the memory, and when the authorization for decipherment is authenticated, deciphering the ciphered information loaded in the memory and displaying the deciphered information as plaintext.

In an embodiment, the first mobile terminal ID information and the stored information may be read by: reading the first mobile terminal ID information by reading the starting part of the text file of a length of the first mobile terminal ID information, and reading the stored information in the text file starting from an offset point, wherein a length between a starting point of the text file and the offset point equals the length of the first mobile terminal ID information.

In an embodiment, the method may further include a step of: when a mode of displaying text information in cipher is determined and/or the authorization for decipherment is not authenticated, displaying ciphertext by on a display interface of a second mobile terminal, displaying, in cipher, the information loaded in the memory while disabling a function of information creation, modification and deletion.

In an embodiment, the method may further include a step of: providing a user with an interface for setting a mode of displaying text information, via which the user may set a mode of displaying text information, wherein the mode of displaying text information may include the mode of displaying text information as plaintext and a mode of displaying text information in cipher.

In an embodiment, the first mobile terminal ID information may be feature information uniquely identifying a first mobile terminal, and may be:

an Electronic Serial Number (ESN), a Mobile Equipment Identifier (MEID), or a unique identifier of the first mobile terminal set by a mobile terminal manufacturer;

or may be: a ciphered ID obtained by converting an ESN, a MEID, or a unique identifier of the first mobile terminal set by a mobile terminal manufacturer using a ciphering algorithm.

In an embodiment, the step of authenticating, according to the first mobile terminal ID information, an authorization for decipherment may be: reading, by a second mobile terminal, the first mobile terminal ID information written in the starting part of the text file when the text file is created and initialized; reading information on an ID of the second mobile terminal; comparing the information on the ID of the second mobile terminal to the first mobile terminal ID information; and determining that the authorization for decipherment is authenticated when the information on the ID of the second mobile terminal is identical to the first mobile terminal ID information; or determining that the authorization for decipherment is not authenticated when the information on the ID of the second mobile terminal is not identical to the first mobile terminal ID information;

or the step of authenticating, according to the first mobile terminal ID information, an authorization for decipherment may be: converting information on an ID of a second mobile terminal using a ciphering algorithm to obtain a ciphered second ID; comparing the ciphered second ID to the first mobile terminal ID information; and determining that the authorization for decipherment is authenticated when the ciphered second ID is identical to the first mobile terminal ID information; or determining that the authorization for decipherment is not authenticated when the ciphered second ID is not identical to the first mobile terminal ID information.

The disclosure further provides a device for managing security of information in a mobile terminal, including: a storage module, a text ciphering and writing module, a text reading module, a decipherment authorization authenticating module and a text deciphering and displaying module, wherein the text ciphering and writing module is configured for: in creating and initializing a text file, writing first mobile terminal identifier (ID) information in a starting part of the text file; and in storing information, ciphering information to be stored, writing the ciphered information in the text file, and storing the text file in the storage module;

the storage module is configured for storing the text file;

the text reading module is configured for: in reading the first mobile terminal ID information and the stored information by a second mobile terminal, loading, from the storage module, the first mobile terminal ID information and the ciphered information into a memory;

the decipherment authorization authenticating module is configured for: determining a mode of displaying text information; and in displaying the stored information by the second mobile terminal, when a mode of displaying text information as plaintext is determined, authenticating, according to the first mobile terminal ID information, an authorization for decipherment of the ciphered information loaded in the memory, and when the authorization for decipherment is authenticated; and when the authorization for decipherment is authenticated, sending the text deciphering and displaying module a notification of an authenticated authorization for decipherment; and the text deciphering and displaying module is configured for: after receiving the notification sent by the decipherment authorization authenticating module, deciphering the ciphered information loaded in the memory and displaying the deciphered information as plaintext.

In an embodiment, the device may further include a ciphertext displaying module configured for, when receiving from the decipherment authorization authenticating module, a notification to display text information in cipher, displaying ciphertext by: on a display interface of the second mobile terminal, displaying, in cipher, the information loaded in the memory while disabling a function of information creation, modification and deletion, wherein the decipherment authorization authenticating module may be configured for: when a mode of displaying text information in cipher is determined and/or the authorization for decipherment is not authenticated, sending the ciphertext displaying module the notification to display text information in cipher.

In an embodiment, the device may further include a text display setting module configured for providing a user with an interface for setting a mode of displaying text information, wherein the text deciphering and displaying module may be further configured for displaying text information in the mode of displaying text information set by the user using the text display setting module.

The disclosure further provides a mobile terminal configured for: in creating and initializing a text file, writing mobile terminal identifier (ID) information in a starting part of the text file, and in storing information, ciphering information to be stored, writing the ciphered information in the text file, and storing the text file; in reading mobile terminal ID information and stored information, loading the to-be-read mobile terminal ID information and ciphered information into a memory, determining a mode of displaying text information, and in displaying the read stored information, when a mode of displaying text information as plaintext is determined, authenticating, according to the read mobile terminal ID information, an authorization for decipherment of the ciphered information loaded in the memory, and when the authorization for decipherment is authenticated, deciphering the ciphered information loaded in the memory and displaying the deciphered information as plaintext.

In an embodiment, the mobile terminal may be further configured for: when a mode of displaying text information in cipher is determined and/or the authorization for decipherment is not authenticated, displaying ciphertext by on a display interface of the mobile terminal, displaying, in cipher, the information loaded in the memory while disabling a function of information creation, modification and deletion.

In an embodiment, the mobile terminal may be further configured for: providing a user with an interface for setting a mode of displaying text information, and displaying text information in the mode of displaying text information set by the user via the interface for setting a mode of displaying text information.

With the method and device for managing security of information in a mobile terminal, as well as the mobile terminal according to the disclosure, in creating and initializing a text file, first mobile terminal ID information is written in a starting part of the text file; and in storing information, information to be stored is ciphered and written in the text file, and the text file is stored; in reading first mobile terminal ID information and stored information, the first mobile terminal ID information and the ciphered information are loaded into a memory; and a mode of displaying text information is determined; and in displaying the stored information, when it is determined to display text information as plaintext, authentication is performed to determine if a local second mobile terminal is authorized to decipher the ciphered information loaded in the memory according to the loaded first mobile terminal ID information, and when the second mobile terminal is authorized, the ciphered information loaded in the memory is deciphered and displayed as plaintext. With the disclosure, information stored in a mobile terminal is ciphertext and an authorization for decipherment has to be authenticated before ciphered information can be deciphered. Therefore, even if a second user connects a first mobile terminal of a first user to a computer via a USB and then copies data stored in the first mobile terminal to a second mobile terminal (especially of the same brand and the same model as the first mobile terminal), as identifier information of the second mobile terminal differs from that of the first mobile terminal, the second mobile terminal is not authorized to decipher the copied information, which then cannot be displayed or cannot be displayed normally. Thus, information stored in a mobile terminal of a user will not be stolen by someone else.

In addition, as mobile terminal ID information is available to no one other than a user of the mobile terminal, nobody can steal information stored in the mobile terminal using a PC-side software of the mobile terminal, thereby ensuring security of information stored in the mobile terminal.

DETAILED DESCRIPTION

According to embodiments of the disclosure, in creating and initializing a text file, first mobile terminal ID information is written in a starting part of the text file; and in storing information, information to be stored is ciphered and written in the text file, and the text file is stored; in reading the first mobile terminal ID information and the stored information, the first mobile terminal ID information and the ciphered information are loaded into a memory; a mode of displaying text information is determined; in displaying the stored information, when it is determined to display text information as plaintext, authentication is performed to determine if a local mobile terminal is authorized to decipher the ciphered information loaded in the memory according to the first mobile terminal ID information, and when the mobile terminal is authorized, the ciphered information is deciphered and displayed as plaintext.

The first mobile terminal ID information may be read by reading the starting part of the text file of a length of the first mobile terminal ID information. In reading the stored information, the cipher information in the text file, starting from an offset point, may be read into the memory, where a length between a starting point of the text file and the offset point equals the length of the first mobile terminal ID information.

When a mode of displaying text information in cipher is determined and/or the authorization for decipherment is not authenticated, ciphertext is displayed by: on a display interface of a second mobile terminal, displaying, in cipher, the information loaded in the memory while disabling a function of information creation, modification and deletion.

The mobile terminal according to the disclosure may further provide a user with an interface for setting a mode of displaying text information, via which the user sets a mode of displaying text information, such as displaying text information as plaintext or displaying text information in cipher.

The disclosure is elaborated below with reference to accompanying drawings and specific embodiments.

Figure 1:
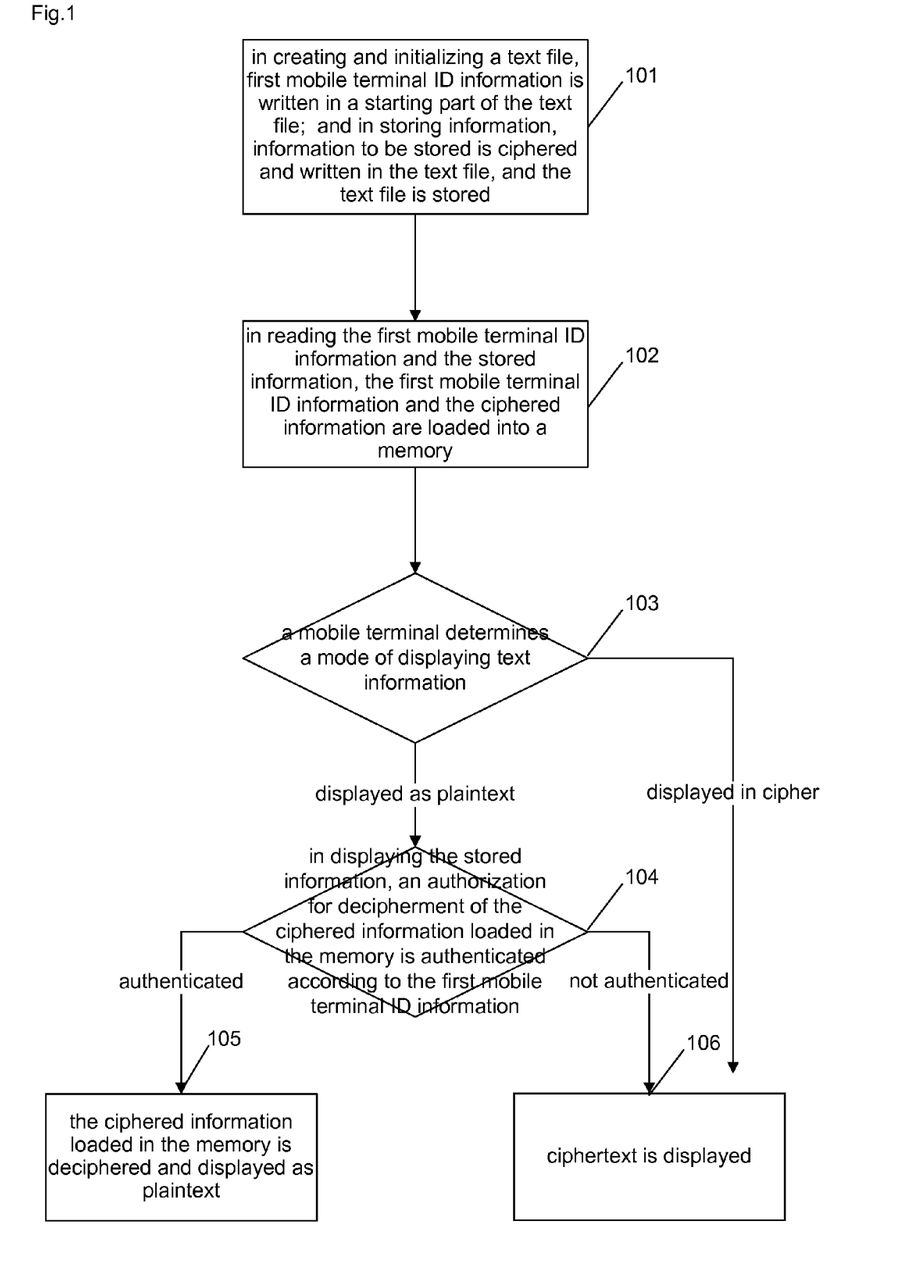
FIG. 1 is a flowchart of implementing a method for managing security of information in a mobile terminal according to the disclosure.

FIG. 1 is a flowchart of implementing a method for managing security of information in a mobile terminal according to the disclosure. As shown in FIG. 1, the method includes steps as follows.

In Step 101, in creating and initializing a text file, first mobile terminal ID information is written in a starting part of the text file; and in storing information, information to be stored is ciphered and written in the text file, and the text file is stored.

Specifically, in creating and initializing a text file, a first mobile terminal writes ID information uniquely identifying the first mobile terminal into the starting part of the text file.

Then, after a user inputs the information to be stored through an interface, the first mobile terminal writes the information input by the user into the text file immediately after the first mobile terminal ID information.

That is, data in the text file are formed by two parts, namely, a first part of data, that is, data in the starting part, which contains the first mobile terminal ID information, and a second part of data, that is, the user data information to be stored, which starts immediately after the first mobile terminal ID information.

Here, the first mobile terminal ID information is written only once when a file is initialized after the file is created, and is no longer written when user data are written subsequently.

Figure 2:
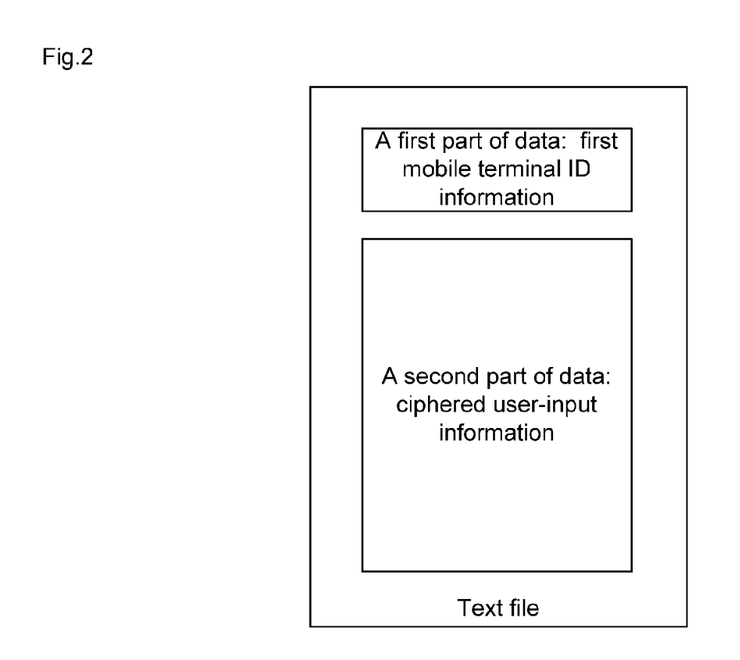
FIG. 2 is a schematic diagram of a structure of a text file according to the disclosure.

Before writing the information to be stored into the text file, the first mobile terminal needs to cipher the information input by the user, which may be done using an existing ciphering algorithm such as MD5; then the ciphered information is written in the text file and the text file is stored. The structure of the text file is as shown in FIG. 2.

The first mobile terminal ID information may be: an Electronic Serial Number (ESN), a Mobile Equipment Identifier (MEID), or a unique identifier of the first mobile terminal set by a mobile terminal manufacturer. The first mobile terminal ID information serves as data for authenticating the authorization for decipherment of the text file when information is read subsequently. The first mobile terminal ID information identifies the mobile terminal creating the text file and the mobile terminal that is authorized to read and decipher the text file. Of course, the first mobile terminal ID information may also be: a ciphered ID obtained by converting an ESN, a MEID, or a unique identifier of the first mobile terminal set by a mobile terminal manufacturer using, for example, an existing ciphering algorithm.

In Step 102, in reading the first mobile terminal ID information and the stored information, the first mobile terminal ID information and the ciphered information are loaded into a memory.

Specifically, the first mobile terminal ID information may be read by reading the starting part of the text file of a length of the first mobile terminal ID information. In reading the stored information, the cipher information in the text file, starting from an offset point, may be read into the memory, where a length between a starting point of the text file and the offset point equals the length of the first mobile terminal ID information.

In addition, the mobile terminal according to the disclosure may provide a user with an interface for setting a mode of displaying text information, via which the user sets a mode of displaying text information, such as displaying text information as plaintext or displaying text information in cipher. Specifically, a mode of displaying the stored information may be se. When a user uses a mobile terminal, text information may be displayed in the mobile terminal as plaintext or in cipher, for example. Meanwhile, an entry password for switching a mode of displaying text information may be set for a mobile terminal. The entry password is known only by the user of the mobile terminal, such that an illegal user cannot perform any illegal operation on a mode of displaying text information of the mobile terminal.

When the user of a mobile terminal sets a mode of displaying text information as plaintext, the mobile terminal displays text information as plaintext. When the user of a mobile terminal sets a mode of displaying text information in cipher, the mobile terminal displays text information as ciphertext, and may further disable a function of information creation, modification and deletion.

In Step 103, a second mobile terminal to display stored information determines a mode of displaying text information; and Step 104 is performed if text information is to be displayed as plaintext, or Step 106 is performed if text information is to be displayed in cipher.

In Step 104, in displaying the stored information, an authorization for decipherment of the ciphered information loaded in the memory is authenticated according to the first mobile terminal ID information; Step 105 is performed if it is authenticated, or Step 106 is performed if the authorization for decipherment is not authenticated.

Here, in displaying the stored information, the second mobile terminal performs authentication to determine if the second mobile terminal itself is authorized to decipher the ciphered information loaded in the memory according to the first mobile terminal ID information. Specifically, the second mobile terminal reads information on an ID of the second mobile terminal itself, that is, the information uniquely identifies the second mobile terminal, such as an ESN or MEID of the second mobile terminal, or a ciphered ID obtained by converting the ESN or MEID of the second mobile terminal. The second mobile terminal compares the read information on the ID of the second mobile terminal with the first mobile terminal ID information, namely, the data for authenticating the authorization for decipherment. Alternatively, the second mobile terminal compares the ciphered ID obtained by converting the information on the ID of the second mobile terminal using a ciphering algorithm with the first mobile terminal ID information. When the compared data are the same, the second mobile terminal is authenticated and step 105 is performed. When the compared data are different, the second mobile terminal is not authenticated and step 106 is performed.

In Step 105, the ciphered information loaded in the memory is deciphered and displayed as plaintext.

Specifically, the second mobile terminal deciphers the ciphertext in the text file loaded in the memory using an existing deciphering algorithm and displays the deciphered plaintext before the user of the second mobile terminal via an interface.

In Step 106, ciphertext is displayed.

Specifically, if the authorization for decipherment is not authenticated, then ciphertext is displayed. Namely, on the display interface of the second mobile terminal, the information loaded in the memory is displayed in cipher while a function of information creation, modification and deletion is disabled.

The method according to the disclosure is elaborated below with an example in which information in a first mobile terminal is contact information in a phone book and mobile terminal ID information is an ESN.

When initially creating and initializing a database file for a phone book, the first mobile terminal reads the ESN of the first mobile terminal itself, and writes the read ESN in the starting part of a phone book text file as data for authenticating an authorization for decipherment of the text file of the phone book so as to identify the mobile terminal to which the phone book text file belongs; data following the data for authenticating an authorization for decipherment are actual data of the phone book. The first mobile terminal ciphers contact information of the phone book input by a user and stores the ciphered information in the database file.

In addition, the user of the first mobile terminal may set a mode of displaying the phone book, and provide protection by authorization in modification of the mode of displaying the phone book using an entry password such that no illegal user can perform any illegal operation on the mode of displaying the contact information in the phone book of the first mobile terminal.

When the user of the first mobile terminal sets that text information is to be displayed in cipher, the first mobile terminal displays the contact information in the phone book to the user in cipher while disabling a function of contact information creation, modification and deletion.

Figure 4:
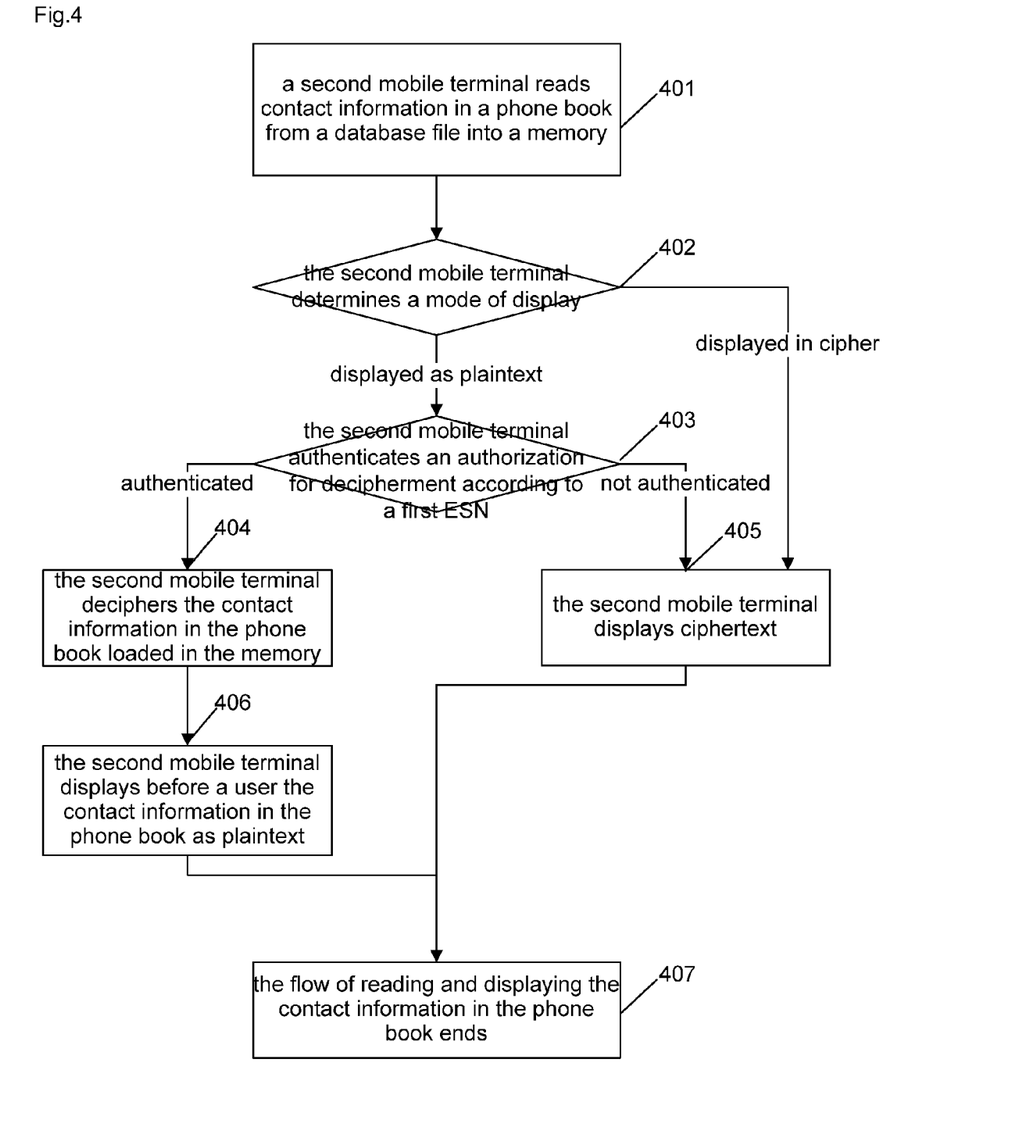
FIG. 4 is a flowchart of implementing a method for managing security of information in a mobile terminal according to an embodiment of the disclosure.

As shown in FIG. 4, a flow of reading and displaying contact information in a phone book by a second mobile terminal may include steps as follows.

In Step 401, a second mobile terminal reads contact information in a phone book from a database file into a memory.

In Step 402, the second mobile terminal determines a mode of display; Step 403 is performed if the file is to be displayed as plaintext, or Step 405 is performed if the file is to be displayed in cipher.

In Step 403, the second mobile terminal authenticates an authorization for decipherment according to a first ESN; Step 404 is performed if it is authenticated, or Step 405 is performed if the authorization for decipherment is not authenticated.

Specifically, the second mobile terminal reads a second ESN of the second mobile terminal itself, and the first ESN loaded in an memory from the starting part of the database file containing the contact information. When the first ESN and the second ESN are identical, or respective ciphered IDs of the first ESN and the second ESN are the same, the second mobile terminal is authenticated and Step 404 is performed; otherwise, the second mobile terminal is not authenticated and Step 405 is performed.

In Step 404, the second mobile terminal deciphers the contact information in the phone book loaded in the memory; and then Step 406 is performed.

In Step 405, the second mobile terminal displays ciphertext; and then Step 407 is performed.

That is, the contact information is not deciphered but is displayed as ciphertext while a function of contact information creation, modification and deletion is disabled.

Here, even if a mode of displaying text information as plaintext is set, the contact information is still displayed in cipher, and the function of contact information creation, modification and deletion is disabled.

In Step 406, the second mobile terminal displays before a user the contact information in the phone book as plaintext.

In Step 407, the flow of reading and displaying the contact information in the phone book ends.

When the user of a mobile terminal needs to add new contact information in a phone book, the following steps may be performed.

In Step I, a user inputs, on an interface of a mobile terminal, new contact information, such as a name, a phone number, an Email address, an address, a company, a position and a birthday of a new contact, and clicks 'save'.

In Step II, the mobile terminal ciphers the contact information input by the user and converts, in a memory, the ciphered contact information into cache data matching an interface of a database.

In Step 3, the mobile terminal writes the cache data into the database and finally writes the ciphered contact information in the phone book into a file system of the database through a database operation.

The flow of adding contact information to a phone book is then completed.

When a user of a mobile terminal needs to modify read contact information, the following steps may be performed.

In Step I, a user edits and modifies, on an interface of a mobile terminal, contact information, such as a name, a phone number, an Email address, an address, a company, a position and a birthday of a contact, and clicks 'save'.

Here, the mobile terminal has displayed before the user, the contact information of a phone book as plaintext.

In Step II, the mobile terminal ciphers the contact information input by the user and converts, in a memory, the ciphered contact information into cache data matching an interface of a database.

In Step 3, the mobile terminal writes the cache data into the database to replace contact information in the database existing before the modification, and finally writes ciphertext of the modified contact information into a file system of the database through a database operation.

The flow of modifying contact information is then completed.

When a user of a mobile terminal needs to delete read contact information, the following steps may be performed.

In Step 1, a user selects contact information to be deleted on an interface of a mobile terminal and clicks 'OK'.

Here, the mobile terminal has displayed, before the user, the contact information of a phone book as plaintext.

In Step 2, the mobile terminal deletes the contact information to be deleted from a database.

In Step 3, the mobile terminal deletes the contact information to be deleted from a memory.

The flow of deleting contact information in a phone book is then completed.

These are four basic operations performed in a mobile terminal on contact information of a phone book, that is, reading and displaying, adding/creating, modifying, and deleting. Other management of contact information of a phone book may be implemented by combining the four basic operations.

Figure 3:
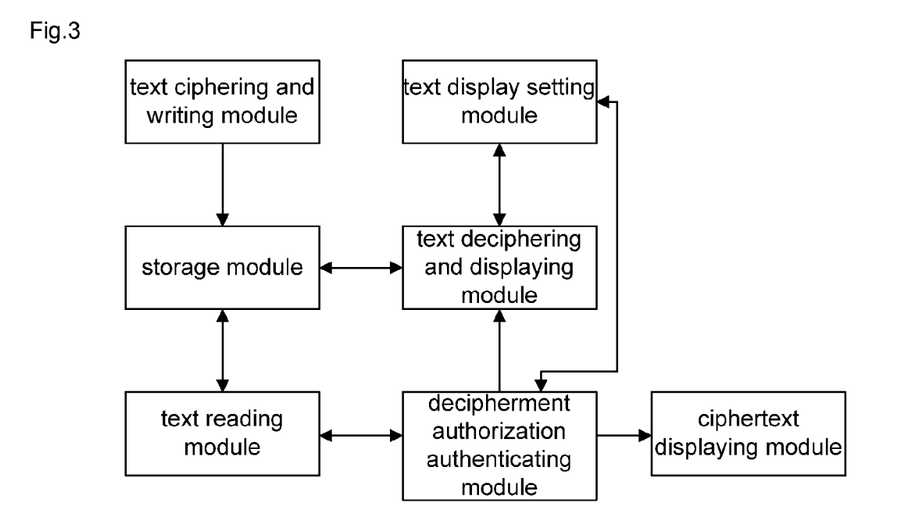
FIG. 3 is a schematic diagram of a structure of a device for managing security of information in a mobile terminal according to the disclosure.

The disclosure also provides a device for managing security of information in a mobile terminal. As shown in FIG. 3, the device includes a storage module, a text ciphering and writing module, a text reading module, a decipherment authorization authenticating module and a text deciphering and displaying module. The device may further include a ciphertext displaying module.

The text ciphering and writing module is configured for: in creating and initializing a text file, writing first mobile terminal identifier (ID) information in a starting part of the text file; and in storing information, ciphering information to be stored, writing the ciphered information in the text file, and storing the text file in the storage module;

The storage module is configured for storing the text file;

The text reading module is configured for: in reading the first mobile terminal ID information and the stored information by a second mobile terminal, loading, from the storage module, the first mobile terminal ID information and the ciphered information into a memory.

The first mobile terminal ID information may be read by reading the starting part of the text file of a length of the first mobile terminal ID information. The second mobile terminal may read user data information starting from an offset point, where a length between a starting point of the text file and the offset point equals the length of the first mobile terminal ID information.

The decipherment authorization authenticating module is configured for: determining a mode of displaying text information; and in displaying the stored information by the second mobile terminal, when a mode of displaying text information as plaintext is determined, authenticating, according to the first mobile terminal ID information, an authorization for decipherment of the ciphered information loaded in the memory, and when the authorization for decipherment is authenticated; and when the authorization for decipherment is authenticated, sending the text deciphering and displaying module a notification of an authenticated authorization for decipherment.

The text deciphering and displaying module is configured for: after receiving the notification sent by the decipherment authorization authenticating module, deciphering the ciphered information loaded in the memory and displaying the deciphered information as plaintext.

The ciphertext displaying module may be configured for, when receiving from the decipherment authorization authenticating module, a notification to display text information in cipher, displaying ciphertext by: on a display interface of the second mobile terminal, displaying, in cipher, the information loaded in the memory while disabling a function of information creation, modification and deletion.

The decipherment authorization authenticating module may be further configured for: when a mode of displaying text information in cipher is determined and/or the authorization for decipherment is not authenticated, sending the ciphertext displaying module the notification to display text information in cipher.

The device may further include a text display setting module configured for providing a user with an interface for setting a mode of displaying text information. The text deciphering and displaying module may be further configured for displaying text information in the mode of displaying text information set by the user using the text display setting module.

In an actual application, the user may sets to display text information as plaintext or ciphertext using the interface for setting a mode of displaying text information.

The disclosure also provides a mobile terminal configured for: in creating and initializing a text file, writing mobile terminal identifier (ID) information in a starting part of the text file, and in storing information, ciphering information to be stored, writing the ciphered information in the text file, and storing the text file; in reading mobile terminal ID information and stored information, loading the to-be-read mobile terminal ID information and ciphered information into a memory, determining a mode of displaying text information, and in displaying the read stored information, when a mode of displaying text information as plaintext is determined, authenticating, according to the read mobile terminal ID information, an authorization for decipherment of the ciphered information loaded in the memory, and when the authorization for decipherment is authenticated, deciphering the ciphered information loaded in the memory and displaying the deciphered information as plaintext.

The mobile terminal may be further configured for: when a mode of displaying text information in cipher is determined and/or the authorization for decipherment is not authenticated, displaying ciphertext by on a display interface of the mobile terminal, displaying, in cipher, the information loaded in the memory while disabling a function of information creation, modification and deletion.

The mobile terminal may be further configured for: providing a user with an interface for setting a mode of displaying text information, and displaying text information in the mode of displaying text information set by the user via the interface for setting a mode of displaying text information.

What described are merely embodiments of the disclosure and are not to be construed as limitation to the protection scope of the disclosure.

The invention claimed is:

1. A method for managing security of information in a mobile terminal, comprising steps of:
   in creating and initializing a text file, writing first mobile terminal identifier (ID) information in a starting part of the text file; and in storing information, ciphering information to be stored, writing the ciphered information in the text file, and storing the text file;
   in reading the first mobile terminal ID information and the stored information, loading the first mobile terminal ID information and the ciphered information into a memory;
   determining, by a hardware processor, a mode of displaying text information; and in displaying the stored information, when a mode of displaying text information as plaintext is determined, authenticating, according to the first mobile terminal ID information, an authorization for decipherment of the ciphered information loaded in the memory, and when the authorization for decipherment is authenticated, deciphering the ciphered information loaded in the memory and displaying the deciphered information as plaintext; and
   when a mode of displaying text information in cipher is determined or the authorization for decipherment is not authenticated, displaying ciphertext by
   on a display interface of a second mobile terminal, displaying, in cipher, the information loaded in the memory while disabling a function of information creation, modification and deletion.

2. The method according to claim 1, wherein the first mobile terminal ID information and the stored information are read by:
   reading the first mobile terminal ID information by reading the starting part of the text file of a length of the first mobile terminal ID information, and reading the stored information in the text file starting from an offset point, wherein a length between a starting point of the text file and the offset point equals the length of the first mobile terminal ID information.

3. The method according to claim 2, wherein the first mobile terminal ID information is feature information uniquely identifying a first mobile terminal, and is:
   an Electronic Serial Number (ESN), a Mobile Equipment Identifier (MEID), or a unique identifier of the first mobile terminal set by a mobile terminal manufacturer;
   or is: a ciphered ID obtained by converting an ESN, a MEID, or a unique identifier of the first mobile terminal set by a mobile terminal manufacturer using a ciphering algorithm.

4. The method according to claim 2, wherein the step of authenticating, according to the first mobile terminal ID information, an authorization for decipherment is:
   reading, by a second mobile terminal, the first mobile terminal ID information written in the starting part of the text file when the text file is created and initialized; reading information on an ID of the second mobile terminal; comparing the information on the ID of the second mobile terminal to the first mobile terminal ID information; and determining that the authorization for decipherment is authenticated when the information on the ID of the second mobile terminal is identical to the first mobile terminal ID information; or determining that the authorization for decipherment is not authenticated when the information on the ID of the second mobile terminal is not identical to the first mobile terminal ID information;
   or the step of authenticating, according to the first mobile terminal ID information, an authorization for decipherment is:
   converting information on an ID of a second mobile terminal using a ciphering algorithm to obtain a ciphered second ID; comparing the ciphered second ID to the first mobile terminal ID information; and determining that the authorization for decipherment is authenticated when the ciphered second ID is identical to the first mobile terminal ID information; or determining that the authorization for decipherment is not authenticated when the ciphered second ID is not identical to the first mobile terminal ID information.

5. The method according to claim 1, further comprising: providing a user with an interface for setting a mode of displaying text information, via which the user sets a mode of displaying text information,
   wherein the mode of displaying text information comprises the mode of displaying text information as plaintext and a mode of displaying text information in cipher.

6. The method according to claim 5, wherein the first mobile terminal ID information is feature information uniquely identifying a first mobile terminal, and is:
   an Electronic Serial Number (ESN), a Mobile Equipment Identifier (MEID), or a unique identifier of the first mobile terminal set by a mobile terminal manufacturer;
   or is: a ciphered ID obtained by converting an ESN, a MEID, or a unique identifier of the first mobile terminal set by a mobile terminal manufacturer using a ciphering algorithm.

7. The method according to claim 5, wherein the step of authenticating, according to the first mobile terminal ID information, an authorization for decipherment is:
   reading, by a second mobile terminal, the first mobile terminal ID information written in the starting part of the text file when the text file is created and initialized; reading information on an ID of the second mobile terminal; comparing the information on the ID of the second mobile terminal to the first mobile terminal ID information; and determining that the authorization for decipherment is authenticated when the information on the ID of the second mobile terminal is identical to the first mobile terminal ID information; or determining that the authorization for decipherment is not authenticated when the information on the ID of the second mobile terminal is not identical to the first mobile terminal ID information;
   or the step of authenticating, according to the first mobile terminal ID information, an authorization for decipherment is:
   converting information on an ID of a second mobile terminal using a ciphering algorithm to obtain a ciphered second ID; comparing the ciphered second ID to the first mobile terminal ID information; and determining that the authorization for decipherment is authenticated when the ciphered second ID is identical to the first mobile terminal ID information; or determining that the authorization for decipherment is not authenticated when the ciphered second ID is not identical to the first mobile terminal ID information.

8. The method according to claim 1, wherein the first mobile terminal ID information is feature information uniquely identifying a first mobile terminal, and is:
   an Electronic Serial Number (ESN), a Mobile Equipment Identifier (MEID), or a unique identifier of the first mobile terminal set by a mobile terminal manufacturer;

or is: a ciphered ID obtained by converting an ESN, a MEID, or a unique identifier of the first mobile terminal set by a mobile terminal manufacturer using a ciphering algorithm.

9. The method according to claim 1, wherein the step of authenticating, according to the first mobile terminal ID information, an authorization for decipherment is:
reading, by a second mobile terminal, the first mobile terminal ID information written in the starting part of the text file when the text file is created and initialized; reading information on an ID of the second mobile terminal; comparing the information on the ID of the second mobile terminal to the first mobile terminal ID information; and determining that the authorization for decipherment is authenticated when the information on the ID of the second mobile terminal is identical to the first mobile terminal ID information; or determining that the authorization for decipherment is not authenticated when the information on the ID of the second mobile terminal is not identical to the first mobile terminal ID information;
or the step of authenticating, according to the first mobile terminal ID information, an authorization for decipherment is:
converting information on an ID of a second mobile terminal using a ciphering algorithm to obtain a ciphered second ID; comparing the ciphered second ID to the first mobile terminal ID information; and determining that the authorization for decipherment is authenticated when the ciphered second ID is identical to the first mobile terminal ID information; or determining that the authorization for decipherment is not authenticated when the ciphered second ID is not identical to the first mobile terminal ID information.

10. A device for managing security of information in a mobile terminal, comprising;
at least one hardware processor:
memory in electronic communication with the at least one hardware processor; and
instructions stored in the memory, the instructions being executable by the at least one hardware processor,
wherein the instructions comprise: a storage instruction, a text ciphering and writing instruction, a text reading instruction, a decipherment authorization authenticating instruction and a text deciphering and displaying instruction, wherein
the text ciphering and writing instruction causes: in creating and initializing a text file, writing first mobile terminal identifier (ID) information in a starting part of the text file; and in storing information, ciphering information to be stored, writing the ciphered information in the text file, and sending the storage instruction by the hardware processor;
the storage instruction causes storing the text file;
the text reading instruction causes: in reading the first mobile terminal ID information and the stored information by a second mobile terminal, loading, into the memory, the first mobile terminal ID information and the ciphered information stored by the storage instruction;
the decipherment authorization authenticating instruction causes: determining a mode of displaying text information; and in displaying the stored information by the second mobile terminal, when a mode of displaying text information as plaintext is determined, authenticating, according to the first mobile terminal ID information, an authorization for decipherment of the ciphered information loaded in the memory; and when the authorization for decipherment is authenticated, sending the hardware processor a notification of an authenticated authorization for decipherment; and
the text deciphering and displaying instruction causes: after receiving by the hardware processor the notification sent by the decipherment authorization authenticating instruction, deciphering the ciphered information loaded in the memory and displaying the deciphered information as plaintext,
wherein the instructions further comprise a ciphertext displaying instruction causing, when receiving by the hardware processor, a notification to display text information in cipher, displaying ciphertext by: on a display interface of the second mobile terminal, displaying, in cipher, the information loaded in the memory while disabling a function of information creation, modification and deletion, wherein
the decipherment authorization authenticating instruction causes: when a mode of displaying text information in cipher is determined or the authorization for decipherment is not authenticated, sending by the hardware processor, the notification to display text information in cipher.

11. The device according to claim 10, wherein the instructions further comprise a text display setting instruction causing providing a user with an interface for setting a mode of displaying text information, wherein
the text deciphering and displaying instruction causes displaying text information in the mode of displaying text information set by the user using the text display setting instruction.

12. A mobile terminal, comprising at least one hardware processor for: in creating and initializing a text file, writing mobile terminal identifier (ID) information in a starting part of the text file, and in storing information, ciphering information to be stored, writing the ciphered information in the text file, and storing the text file; in reading mobile terminal ID information and stored information, loading the to-be-read mobile terminal ID information and ciphered information into a memory, determining a mode of displaying text information, and in displaying the read stored information, when a mode of displaying text information as plaintext is determined, authenticating, according to the read mobile terminal ID information, an authorization for decipherment of the ciphered information loaded in the memory, and when the authorization for decipherment is authenticated, deciphering the ciphered information loaded in the memory and displaying the deciphered information as plaintext,
wherein the at least one hardware processor is further configured for: when a mode of displaying text information in cipher is determined or the authorization for decipherment is not authenticated, displaying ciphertext by
on a display interface of the mobile terminal, displaying, in cipher, the information loaded in the memory while disabling a function of information creation, modification and deletion.

13. The mobile terminal according to claim 12, wherein the at least one hardware processor is further for: providing a user with an interface for setting a mode of displaying text information, and displaying text information in the mode of displaying text information set by the user via the interface for setting a mode of displaying text information.

* * * * *